US009008223B1

(12) United States Patent
Tamma et al.

(10) Patent No.: US 9,008,223 B1
(45) Date of Patent: Apr. 14, 2015

(54) TRANSMITTER AND METHOD FOR REDUCING THE PEAK-TO-AVERAGE POWER RATIO OF A DIGITALLY MODULATED COMMUNICATION SIGNAL

(71) Applicants: Raja V. Tamma, Leander, TX (US); Kevin B. Traylor, Austin, TX (US); Jianqiang Zeng, Houston, TX (US)

(72) Inventors: Raja V. Tamma, Leander, TX (US); Kevin B. Traylor, Austin, TX (US); Jianqiang Zeng, Houston, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/140,123

(22) Filed: Dec. 24, 2013

(51) Int. Cl.
H04K 1/02 (2006.01)
H04L 25/03 (2006.01)
H04L 25/49 (2006.01)
H04L 27/26 (2006.01)
H04L 25/08 (2006.01)

(52) U.S. Cl.
CPC ............ *H04L 27/2623* (2013.01); *H04L 25/08* (2013.01)

(58) Field of Classification Search
USPC ......................................... 375/295, 296, 146
See application file for complete search history.

(56) References Cited

U.S. PATENT DOCUMENTS

| 7,292,639 B1 | 11/2007 | Demirekler et al. |
| 7,649,950 B2 | 1/2010 | Shen et al. |
| 8,040,787 B2 | 10/2011 | Bar-Ness et al. |
| 8,068,558 B2* | 11/2011 | Morris et al. ................. 375/296 |
| 2004/0142696 A1* | 7/2004 | Saunders et al. .............. 455/450 |
| 2005/0177860 A1* | 8/2005 | Goyal et al. ................... 725/118 |
| 2006/0034378 A1 | 2/2006 | Lindskog et al. |
| 2007/0071120 A1 | 3/2007 | Talwar |
| 2010/0135421 A1 | 6/2010 | Jung et al. |
| 2011/0206207 A1 | 8/2011 | Priotti |

FOREIGN PATENT DOCUMENTS

| EP | 1469649 B1 | 6/2006 |
| EP | 2074783 B1 | 7/2010 |
| EP | 2259533 A1 | 12/2010 |
| WO | 2007048278 A1 | 5/2007 |

* cited by examiner

*Primary Examiner* — Ted Wang

(57) ABSTRACT

A transmitter and method for processing a digitally modulated communication signal, which may reduce peak-to-average-power-ratio (PAPR) while maintaining acceptable error rates is disclosed. After subcarrier mapping, a first digital representation of the signal is upsampled into a second digital representation, which is transformed into a first time domain representation. Samples whose magnitudes exceed a magnitude limit are limited to that limit to produce a second time domain representation. The second time domain representation is transformed to a third frequency domain representation, which is downsampled into a fourth frequency domain representation. In addition to the in-band subcarriers, some out-of-band subcarriers adjacent to the frequency band are preserved while the remaining out-of-band subcarriers are eliminated to produce a fifth frequency domain representation. The fifth frequency domain representation is then transformed to a third time domain representation, which is converted to an analog signal to be transmitted.

20 Claims, 7 Drawing Sheets

TRANSMITTER AND METHOD FOR REDUCING THE PEAK-TO-AVERAGE POWER RATIO OF A DIGITALLY MODULATED COMMUNICATION SIGNAL

BACKGROUND

1. Field of the Disclosure

This disclosure relates generally to digital communication and, more particularly, to reduction of the peak-to-average power ratio of signals of a digital communication system.

2. Background of the Disclosure

Some types of signals for digital communication, for example, a multi-carrier signal, such as an orthogonal frequency division multiplexed (OFDM) signal or a discrete multi-tone (DMT) signal, by nature, has a large peak-to-average power ratio (PAPR) which can pose various problems such as reducing the efficiency of a high-power amplifier (HPA), increasing complexity of signal converters, and severely reducing the average signal power relative to constant envelope modulation techniques. The efficiency of the HPA can be reduced because, in order to avoid operating in the non-linear region of its voltage-current (V-I) characteristic, the HPA may operate with a large back-off from its peak power. The increased complexity of signal converters, such as analog-to-digital converters (ADCs) and digital-to-analog converters (DACs), results from the signal converters having large dynamic ranges that support a large PAPR. The severe reduction of the average signal power relative to constant envelope modulation techniques causes degraded performance and reduction in coverage range, as received signal strengths and signal-to-noise ratios (SNR) are lower.

Simplistic approaches to PAPR reduction that involve amplitude clipping suffer from the problem of peak re-growth. Multiple iterations can overcome this problem but at the expense of increased out-of-band radiation and significantly degraded bit error rate (BER). Besides, the out-of-band radiation cannot be closely controlled, which can cause interference and impair regulatory electromagnetic compliance (EMC).

Other techniques such as coding, tone reservation, tone injection, partial transmit sequences, selected mapping, interleaving, etc., may require modifications to a communication standard, thereby impairing their usefulness. Some of them also require the transmitter to send side information to the receiver, which may require modified receivers to receive and use the side information.

Another method, active constellation extension, does not require any standard modifications but has significantly increased complexity. Such increased complexity may require increased processing capabilities that increase cost.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A transmitter and method for reducing the peak-to-average power ratio (PAPR) of a digitally modulated communication signal is disclosed. Such a transmitter or method may be used in a system that generates digital representations of a filtered multi-carrier analog communication signal based on data to be transmitted, wherein this digital representation is converted to the analog communication signal for transmission. After subcarrier mapping, the a first frequency domain representation is upsampled to produce a second frequency domain representation, and the second frequency domain representation is transformed into a first time domain representation. Samples whose magnitudes exceed a magnitude limit are reduced to that limit to produce a second time domain representation. The second time domain representation is transformed to a third frequency domain representation, which is downsampled into a fourth frequency domain representation. In addition to the in-band subcarriers, some out-of-band subcarriers adjacent to the frequency band are preserved while the remaining out-of-band subcarriers are eliminated to produce a fifth frequency domain representation. The fifth frequency domain representation is then transformed to a third time domain representation, which is converted to obtain an analog signal to be transmitted.

Figure 1:
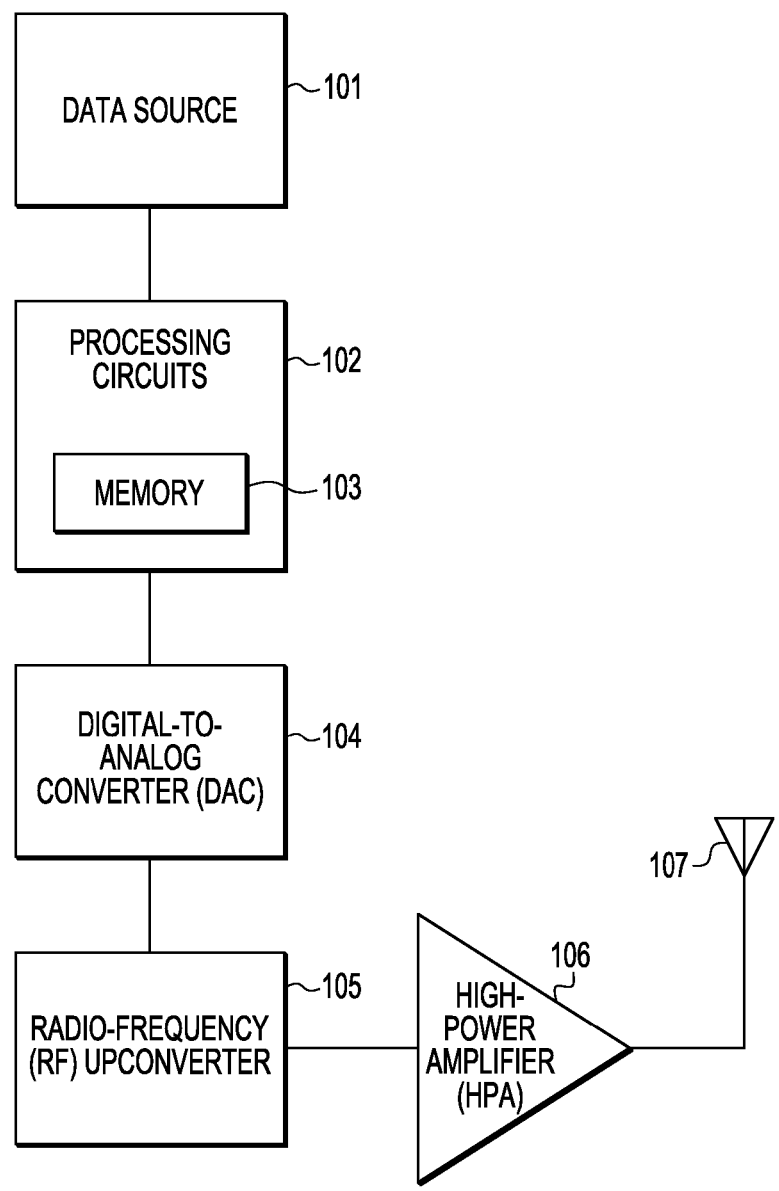
FIG. 1 is a block diagram illustrating a transmitter for reducing the PAPR of a digitally modulated communication signal in accordance with at least one embodiment.

FIG. 1 is a block diagram illustrating a transmitter for reducing the PAPR of a digitally communication signal in accordance with at least one embodiment. The transmitter 100 comprises a data source 101, processing circuits 102, a DAC 104, a radio-frequency (RF) upconverter 105, a HPA 106, and an antenna 107. Data source 101 may be any source of data, such as a source of digital data, which may be natively digital data or digital data representative of analog information, such as from an ADC. Such data may represent, for example, various types of information, such as sound, images, video streams, documents, files, the like, or combinations thereof.

Processing circuits 102 may be a general-purpose instruction-based processor or specialized processor, such as an instruction based digital signal processor (DSP), a state machine, or other type of logic circuits capable of performing operations on data. In the embodiment shown, processing circuits 102 may comprise memory 103. Memory 103 may store instructions to cause processing circuits 102 (e.g., a data processor or DSP) to perform a method, parameter values to be used to configure the operation of processing circuits 102, data to be used by processing circuits 102, such as data from data source 101, data to be output from processing circuits 102, such as a digital representation of a filtered multi-carrier digitally modulated analog communication signal to be provided to DAC 104, the like, or combinations thereof.

DAC 104 provides data conversion to convert a digital representation of an analog signal to an analog signal. According to an embodiment, a digital representation of multi-carrier digitally modulated analog baseband communication signal is provided to DAC 104, which converts the digital representation to an analog signal and provides the analog signal to RF upconverter 105, which upconverts the analog signal in frequency from baseband to RF. Alternatively, RF upconverter 105 may be omitted to obtain an analog signal to be transmitted at baseband, for example, for wired, as opposed to wireless, communications. HPA 106 amplifies the analog signal for transmission via antenna 107, in the case of wireless communication, or, in the case of wired communication, via at least one wire coupled to a receiver.

Figure 2:
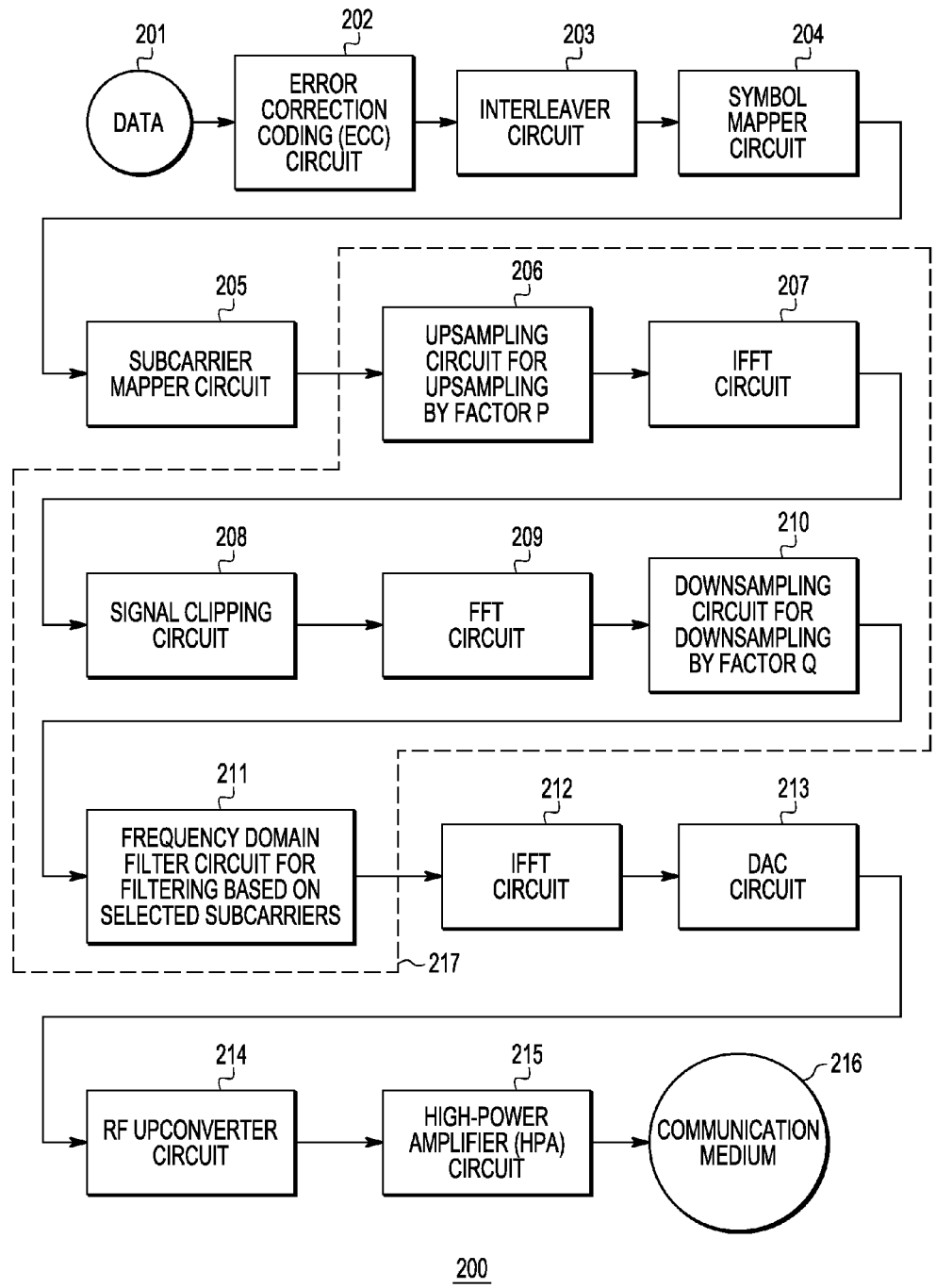
FIG. 2 is a block diagram illustrating a signal processing architecture for reducing the PAPR of a digitally modulated communication signal in accordance with at least one embodiment.

FIG. 2 is a block diagram illustrating a signal processing architecture for reducing the PAPR of a digitally modulated communication signal in accordance with at least one embodiment, as may be implemented, for example, using the embodiment of the transmitter illustrated in FIG. 1. The signal processing architecture 200 comprises data 201, error correction coding (ECC) circuit 202, interleaver circuit 203, symbol mapper circuit 204, subcarrier mapper circuit 205, upsampling circuit 206, inverse fast Fourier transform (IFFT) circuit 207, signal clipping circuit 208, fast Fourier transform (FFT) circuit 209, downsampling circuit 210, frequency domain filter circuit 211, IFFT circuit 212, DAC circuit 213, RF upconverter circuit 214, HPA circuit 215, and communication medium 216. In accordance with the transmitter of FIG. 1, data source 101 may provide data 201, processing circuits 102 may implement circuits 202 through 212, DAC 104 may implement DAC 213, RF upconverter 105 may implement RF upconverter 214, and HPA 106 may implement HPA 215. The circuits of FIG. 2 may be implemented, for example, by hardware, or, for example, by a processor, such as a general-purpose processor or a digital signal processor (DSP), executing instructions to perform the functions of the circuits.

Data 201 is a source of data to be transmitted. ECC circuit 202 performs the addition of ECC information to the data to increase reliability by providing a mechanism for correction of data errors that may occur, for example, during transmission of a signal via communication medium 216. Interleaver circuit 203 represents a mechanism for increasing reliability, for example, resistance to fading in communication medium 216, by interleaving, for example, the data, the ECC information, or a combination thereof.

Symbol mapper circuit 204 maps the data, which may include ECC information, and which may have been interleaved by interleaver circuit 203, to symbols. The symbols represent the data by modulation of a carrier frequency among points of a constellation of magnitude and phase of a digital communication signal. Examples of such modulation include phase shift keying (PSK) and quadrature amplitude modulation (QAM). The symbol mapping may be based, for example, on the data being mapped. For example, the characteristics of the symbol mapping used may be selected based on the characteristics of the data being mapped to improve the performance of symbol mapper circuit 204. Each symbol from symbol mapper circuit 204 is provided to subcarrier mapper circuit 205, which maps each symbol onto a subcarrier, wherein each symbol of multiple symbols can be mapped to a different subcarrier of multiple subcarriers, e.g., multiple symbols are mapped to corresponding multiple subcarriers, at different frequencies from one another. The different frequencies of the multiple subcarriers allow them to simultaneously transmit different data, e.g., symbols, thereby increasing the bandwidth and capacity of the communication medium 216. Thus, subcarrier mapper 205 provides as its output a digital representation of a signal comprising subcarriers at different frequencies, wherein individual subcarriers are modulated according to a symbol that represents a portion of the data to be transmitted.

A digital representation of a signal comprising samples representing the data mapped to symbols assigned to subcarriers is provided by subcarrier mapper circuit 205 to upsampling circuit 206. Upsampling circuit 206 upsamples the digital representation of the signal by an upsampling factor P to obtain a higher sampling rate for the digital representation of the signal. As an example, the upsampling factor P may have a value in a range of all integers from 2 to 8, inclusive (e.g., 2, 3, 4, 5, 6, 7, 8). The higher sampling rate enables more accurate control of the peak power of the signal, as will be described in greater detail herein. Upsampling circuit 206 provides the upsampled digital representation of the signal, in the frequency domain, to IFFT circuit 207. Inverse fast Fourier transform (IFFT) circuit 207 transforms the upsampled digital representation of the signal from the frequency domain to the time domain to produce an upsampled time domain representation of the signal. IFFT circuit 207 provides the upsampled time domain representation of the signal to signal clipping circuit 208. Signal clipping circuit 208 clips the magnitude of the upsampled time domain representation of the signal to produce a clipped upsampled time domain representation. That is to say signal clipping circuit 208 limits the magnitude of samples of the upsampled time domain representation to no more than a magnitude limit to produce samples of a clipped upsampled time domain representation. Such limiting limits the range of magnitudes which the samples may have and therefore reduces the PAPR of the signal. However, such limiting, by itself, may introduce abrupt changes of the slope of the signal in the time domain, which, when considered in the frequency domain, introduces undesired frequency components that can cause interference. Thus, subsequent circuits, such as circuits 209 through 211, are provided to mitigate such undesired frequency components of the clipped upsampled time domain representation. The magnitude limit may be selected to provide the desired reduction in PAPR. Further adjustment of the magnitude limit may be performed in response to the net effects of, for example, circuits 208 through 211, on the PAPR reduction of the signal to be transmitted and an error rate, such as a bit error rate (BER) or block error rate (BLER), of the received signal received from communication medium 216. For example, criteria such as PAPR, BER or BLER, and compliance of the transmitted signal with a permissible spectral emission mask may be accommodated to determine a suitable magnitude limit, a suitable upsampling factor P for circuit 206, a suitable downsampling factor Q for circuit 210, and a suitable selection of subcarriers to be filtered by circuit 211.

Signal clipping circuit 208 provides its output to FFT circuit 209. Fast Fourier transform (FFT) circuit 209 transforms the clipped upsampled signal from the time domain to the frequency domain. FFT circuit 209 transforms the clipped upsampled time domain representation to a clipped upsampled frequency domain representation, which it provides to downsampling circuit 210. Downsampling circuit 210 downsamples the clipped upsampled frequency domain representation by a downsampling factor Q, which need not be the same as the upsampling factor P of upsampling circuit 206, but which results in a downsampled sampling rate preferably at least as high as the original sampling rate before the upsampling of upsampling circuit 206 (although, in an alternate embodiment, the downsampled sampling rate could be lower than the original sampling rate before the upsampling of upsampling circuit 206). As an example, the downsampling factor Q may have a value in a range of all integers from 2 to 8, inclusive (e.g., 2, 3, 4, 5, 6, 7, or 8). As an example, the upsampling factor P may be equal to the downsampling factor Q. As another example, the upsampling factor P may be greater than the downsampling factor Q. For example, if the upsampling factor P is equal to the downsampling factor Q, the downsampled sampling rate would be equal to the original sampling rate before the upsampling, and, if the upsampling factor P is greater than the downsampling factor Q, the downsampled sampling rate would be higher than the original sampling rate before upsampling by a factor of the ratio of P to Q. As examples, pairs of values of upsampling factor P and downsampling factor Q may include 1:1, 2:1, 4:1, 8:1, 2:2, 4:2, 8:2, 4:4, 8:4, 8:8, or other pairs of values, which may conform to, but need not be limited to, the foregoing examples. Downsampling circuit 210 provides a downsampled clipped frequency domain representation to frequency domain filtering circuit 211.

Frequency domain filtering circuit 211 filters the downsampled clipped frequency domain representation based on selected subcarriers to produce a filtered clipped frequency domain representation. Frequency domain filter circuit 211 retains all of the in-band subcarriers (i.e., all of those subcarriers that lie in the frequency band designated to communicate the data to be transmitted) and some, but not all, of the out-of-band subcarriers, wherein the clipping of signal clipping circuit 208 introduced such out-of-band subcarriers. Some of the out-of-band subcarriers are retained, as their nullification would excessively round off the clipping introduced by signal clipping circuit 208, which would result in peak regrowth and impair PAPR reduction. However, others of the out-of-band subcarriers are nullified to limit the range of frequencies occupied by the filtered clipped frequency domain representation and, consequently, the analog signal to be transmitted. Selection of which out-of-band subcarriers are to be retained and which are to be nullified may be performed empirically, for example, based on the effect such selection has not only on PAPR but also on an error rate, such as a bit error rate (BER) or a block error rate (BLER). For example, a number of out-of-band subcarriers adjacent to and above, below, or both above and below the frequency band of the in-band subcarriers may be selected to be retained as included out-of-band subcarriers, while other out-of-band subcarriers farther in frequency from the frequency band of the in-band subcarriers may be selected to be nullified, effectively excluding them as excluded out-of-band sub carriers.

Frequency domain filter circuit 211 provides the filtered clipped frequency domain representation to IFFT circuit 212. IFFT circuit 212 transforms the filtered clipped frequency domain representation to a filtered clipped time domain representation. IFFT circuit 212 provides the filtered clipped time domain representation to DAC circuit 213. DAC circuit 213 converts the filtered clipped time domain representation from digital form to analog form, producing an analog signal. DAC circuit 213 provides the analog signal to RF upconverter circuit 214. RF upconverter circuit 214 upconverts the analog signal in frequency to produce a radio frequency signal to allow wireless communication (or may be omitted in the case of wired communication). RF upconverter circuit 214 provides the RF signal to HPA circuit 215. HPA circuit 215 amplifies the RF signal and transmits the amplified RF signal via communication medium 216. Communication medium 216 may be, for example, free space in the case of wireless communications or, as another example, wiring in the case of wired communications.

It will be appreciated that an adaptive spectral shaping filter 217 is implemented by the combination of upsampling circuit 206, IFFT circuit 207, signal clipping circuit 208, FFT circuit 209, downsampling circuit 210, and frequency domain filter circuit 211. The adaptive spectral shaping filter 217 adapts its impulse response for different OFDM symbols. That is, the filter taps of adaptive spectral shaping filter 217 adapt depending on the symbols mapped to the subcarriers. For example, adaptive spectral shaping filter 217 need not algorithmically adapt its filter characteristics but rather adaptive spectral shaping filter 217, by virtue of the relationship and operation of its constituent circuits, may provide an overall operation that favorably adapts the filtering of different OFDM symbols as a function of those different OFDM symbols. For example, depending upon the symbols to be transmitted, the amount of clipping performed for a given set of symbols can vary. A clipping limit value is used to clip the upsampled time-domain representation received by signal clipping circuit 208 wherein the amount of clipping performed by signal clipping circuit 208 depends on the clipping limit value and the number of and amplitudes of signal peaks of the upsampled time-domain representation exceeding the clipping limit value. As an example, the clipping limit value may be chosen to be in a range from 0.75 to 0.90, inclusive, relative to a normalized peak amplitude of the upsampled time-domain representation. As another example, the clipping limit value may be chosen to be in a range from 0.75 to 0.85, inclusive. As yet another example, the clipping limit value may be chosen to be in a range from 0.79 to 0.81, inclusive. For example, a value or range of values for the clipping limit value may be selected based on the total desired signal dynamic range and the desired peak signal output power.

While IFFT circuit 207 and FFT circuit 209 are discussed above, it should be understood that an IFFT is a type of inverse discrete Fourier transform (IDFT) and IFFT circuit 207 may be implemented using a different type of IDFT and that an FFT is a type of discrete Fourier transform (DFT) and FFT circuit 209 may be implemented using a different type of DFT.

Figure 3:
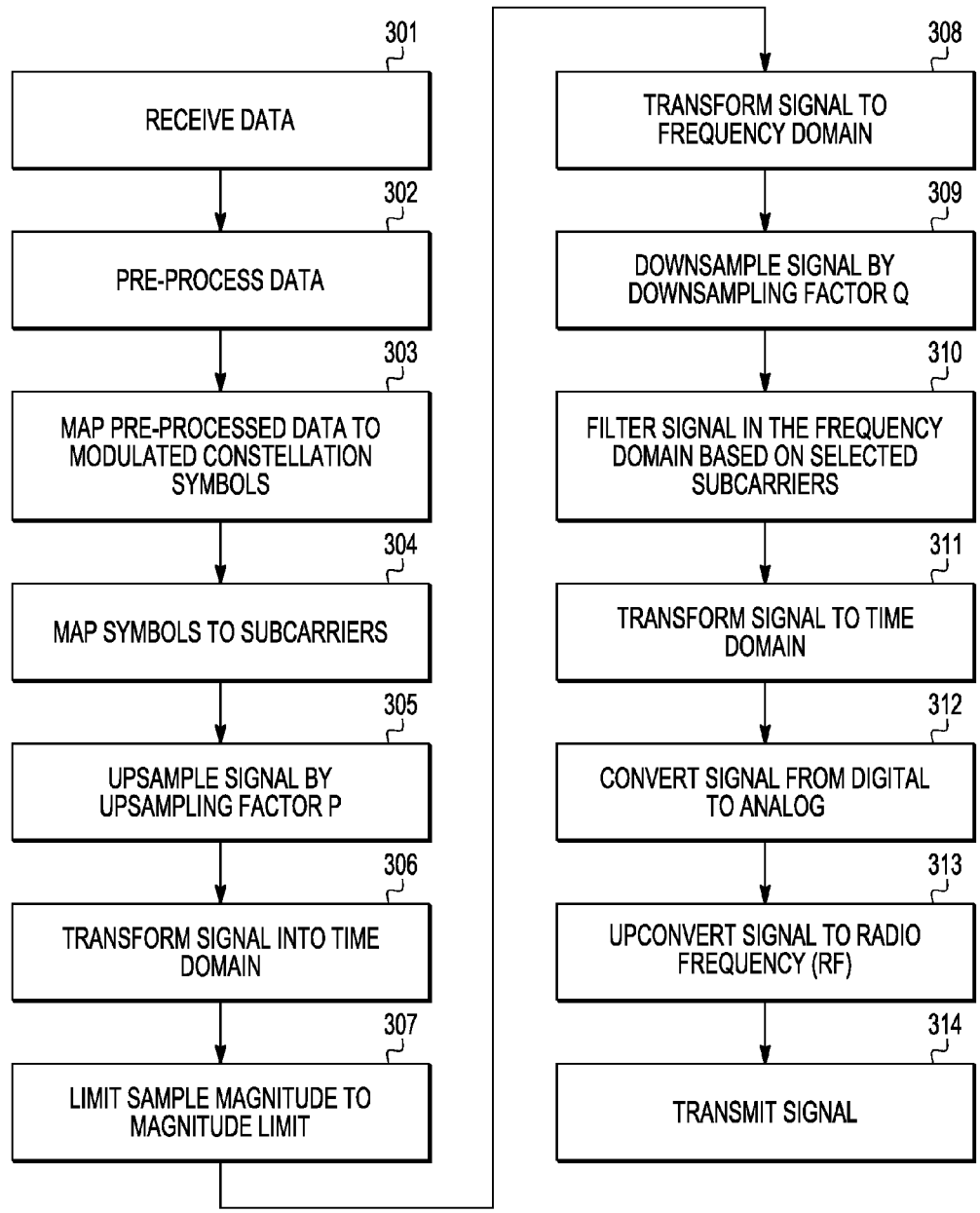
FIG. 3 is a flow diagram illustrating a method for reducing the PAPR of a digitally modulated communication signal in accordance with at least on embodiment.

FIG. 3 is a flow diagram illustrating a method for reducing the PAPR of a digitally modulated communication signal in accordance with at least one embodiment. The method 300 begins in block 301, where data are received for transmission. The data may be received, for example, from data source 201 of FIG. 2. The data can be digital information. From block 301, the method continues to block 302. In block 302, the data are pre-processed. Examples of such pre-processing include ECC and interleaving. The data may be pre-processed, for example, by ECC circuit 202 of FIG. 2. From block 302, the method continues to block 303. In block 303, the pre-processed data are mapped to modulated constellation symbols. For example, a determined number of bits of the digital information can be used to identify a particular constellation symbol to be transmitted at a given subcarrier. Such number of bits may be modified, for example, in response to characteristics, such as BER, BLER, or a received signal strength indication (RSSI) of the received signal received from transmission through the communication medium. The symbol mapping may be performed, for example, by symbol mapper circuit 204 of FIG. 2. From block 303, the method continues to block 304. In block 304, the symbols that represent the data are mapped to subcarriers. The data as mapped to the subcarriers can be represented in the frequency domain. The subcarrier mapping may be performed, for example, by subcarrier mapper circuit 205 of FIG. 2. From block 304, the method continues to block 305. In block 305, a frequency domain representation of a signal comprising samples representative of the data mapped to symbols mapped to subcarriers is upsampled by an upsampling factor P to obtain an upsampled frequency domain representation. Upsampling facilitates more efficient reduction of the peak power, as described below. Performing upsampling in the frequency domain preserves the spectral integrity of the signal and avoids spectral distortion that time domain interpolation would cause. The upsampling may be performed, for example, by upsampling circuit 206 of FIG. 2. From block 305, the method continues to block 306. In block 306, the upsampled frequency domain representation is transformed from the frequency domain into the time domain to produce an upsampled time domain representation. The transformation may be performed, for example, by IFFT circuit 207 of FIG. 2. From block 306, the method continues to block 307. In block 307, the sample magnitudes of the samples of the upsampled time domain representation are limited to a magnitude limit (i.e., the upsampled time domain representation is clipped in the time domain). The clipping may be performed, for example, by signal clipping circuit 208 of FIG. 2.

From block 307, the method continues to block 308. In block 308, the clipped upsampled time domain representation is transformed from the time domain into the frequency domain to produce a clipped upsampled frequency domain representation. The transformation may be performed, for example, by FFT circuit 209 of FIG. 2. From block 308, the method continues to block 309. In block 309, the clipped upsampled frequency domain representation is downsampled by a downsampling factor Q to produce a downsampled clipped frequency domain representation. Thus, the clipped upsampled frequency domain representation is downsampled to the desired sampling rate. If Q<P, control may be exercised over a wider spectral band, which may lead to better peak reduction. As examples, values of P and Q such as P=4 and Q=1 or 2 may be used. As other examples, P=8, and Q=1, 2, or 4. The downsampling may be performed, for example, by downsampling circuit 210 of FIG. 2. From block 309, the method continues to block 310. In block 310, the downsampled clipped frequency domain representation is filtered in the frequency domain based on the frequency range of selected subcarriers to produce a filtered clipped frequency domain representation, such that in-band subcarriers and some out-of-band subcarriers are preserved, effectively including them in the filtered clipped frequency domain representation as included out-of-band subcarriers, while other out-of-band subcarriers are nullified, effectively excluding them from the filtered clipped frequency domain representation as excluded out-of-band subcarriers. Such selective preservation and nullification of out-of-band subcarriers controls peak re-growth, and the signal is thus effectively filtered in the frequency domain.

Even though such selective preservation results in some out-of-band radiation, such out-of-band radiation is generally within tolerable levels and can be closely controlled, for example, to conform to permissible spectral emission mask requirements. A spectral emission mask describes a maximum permissible magnitude at each frequency over a permissible range of frequencies that a signal may occupy in the electromagnetic spectrum. Alternatively, other quantitative descriptions for electromagnetic compliance (EMC) may be specified, and the method of FIG. 3 may be implemented to conform to such quantitative descriptions. The filtering may be performed, for example, by frequency domain filter circuit 211 of FIG. 2. From block 310, the method continues to block 311. In block 311, the filtered clipped frequency domain representation is transformed from the frequency domain into the time domain to produce a filtered clipped time domain representation. The transformation may be performed, for example, by IFFT circuit 212 of FIG. 2. From block 311, the method continues to block 312. In block 312, filtered clipped time domain representation is converted from digital form to analog form to produce an analog signal. The conversion may be performed, for example, by DAC circuit 213 of FIG. 2. From block 312, the method continues to block 313. In block 313, the analog signal is upconverted in frequency to an RF signal. The upconversion may be performed, for example, by RF upconverter circuit 214 of FIG. 2. From block 313, the method continues to block 314. In block 314, the RF signal is transmitted. The transmission may be performed, for example, by HPA circuit 215 of FIG. 2.

Figure 4:
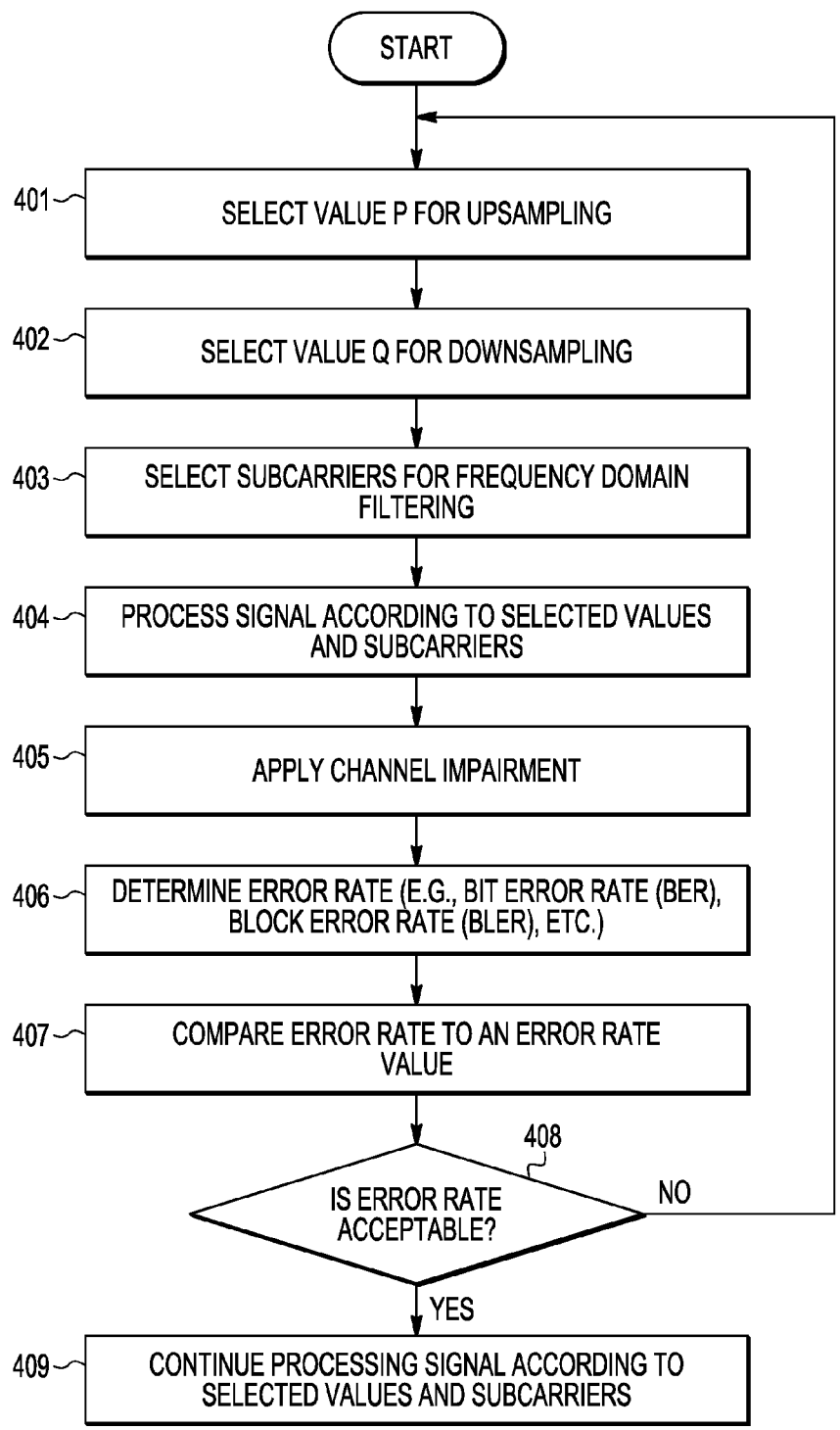
FIG. 4 is a flow diagram illustrating a method for reducing the PAPR of a digitally communication signal in accordance with at least one embodiment.

FIG. 4 is a flow diagram illustrating a method for reducing the PAPR of a digitally modulated communication signal in accordance with at least one embodiment. The method may be performed, for example, by processing circuits 102 of FIG. 1 or, as another example, by hardware configured (e.g., according to executed instructions) to simulate the operation of the transmitter of FIG. 1. In the case of simulation, the results of the simulation may be used to configure processing circuits 102 (e.g., by storing selected values used to produce the results of the simulation in memory 103). The method 400 begins and proceeds to block 401. In block 401, a value P is selected as an upsampling factor. From block 401, the method continues to block 402. In block 402, a value Q is selected as a downsampling factor. From block 402, the method continues to block 403. In block 403, subcarriers are selected for frequency domain filtering. Such subcarriers, by virtue of having been selected, may be referred to as selected subcarriers. Such selected subcarriers may designate, for example, included out-of-band subcarriers to be included in a signal with in-band subcarriers, e.g., carriers that are maintained but are not within the frequency range (i.e., band) of subcarriers sufficient to convey the symbols for the data being communicated, excluded out-of-band subcarriers to be excluded from the signal, e.g., carriers that are not maintained, or subcarriers within a combination of the in-band subcarriers and the included out-of-band subcarriers depending on the specific exemplary embodiment, such that result of processing in block 404 maintains the in-band subcarriers and the included out-of-band subcarriers, but does not maintain the excluded out-of-band subcarriers. For example, the excluded out-of-band subcarriers may comprise all out-of-band subcarriers having frequencies lower than a low frequency limit of the included out-of-band subcarriers. As another example, the excluded out-of-band subcarriers may comprise all out-of-band subcarriers having frequencies higher than a high frequency limit of the included out-of-band subcarriers. As a further example, the excluded out-of-band subcarriers may comprise all out-of-band subcarriers having frequencies lower than a low frequency limit of the included out-of-band subcarriers and all out-of-band subcarriers having frequencies higher than a high frequency limit of the included out-of-band subcarriers.

From block 403, the method continues to block 404. In block 404, the signal (or a digital representation thereof) is processed according to the selected P value, Q value, and subcarriers as selected in blocks 401, 402, and 403. From block 404, the method continues to block 405. In block 405, channel impairment is applied. For example, compensation for noise, multipath, Doppler shift, co-channel interference, adjacent channel interference, the like, or combinations thereof may be applied to compensate for channel impairment. From block 405, the method continues to block 406. In block 406, an error rate is determined based on the processing of the signal (or digital representation thereof) according to the selected values and subcarriers. For example, a BER or BLER may be determined. As the performance of a communication system depends on the performance of a transmitter and the performance of a receiver, not just one or the other, the impact that a transmitter has on the receiver demodulation and decoding performance is another criterion besides the magnitude of PAPR reduction. Thus, a technique to reduce the PAPR should not seriously compromise receiver performance. BER or BLER performance is a metric that may be used to evaluate receiver performance and, along with PAPR reduction, system performance. From block 406, the method continues to block 407. In block 407, the error rate is compared to an error rate value. For example, the error rate value may be a maximum acceptable error rate, a desired maximum error rate, a prescribed standard maximum error rate, or the like. From block 407, the method continues to decision block 408. In decision block 408, a determination is made as to whether or not the error rate is acceptable. If not, the method returns to block 401, and at least one of a new upsampling factor value P, a new downsampling factor value Q, and a new set of subcarriers for frequency domain filtering are selected in at least one of blocks 401, 402, and 403, and their performance is evaluated. If so, the method continues to block 409, where processing of the signal (or digital representation thereof) continues according to the selected values and subcarriers without the need to return to block 401 for further adjustment of the values or subcarriers.

Figure 5:
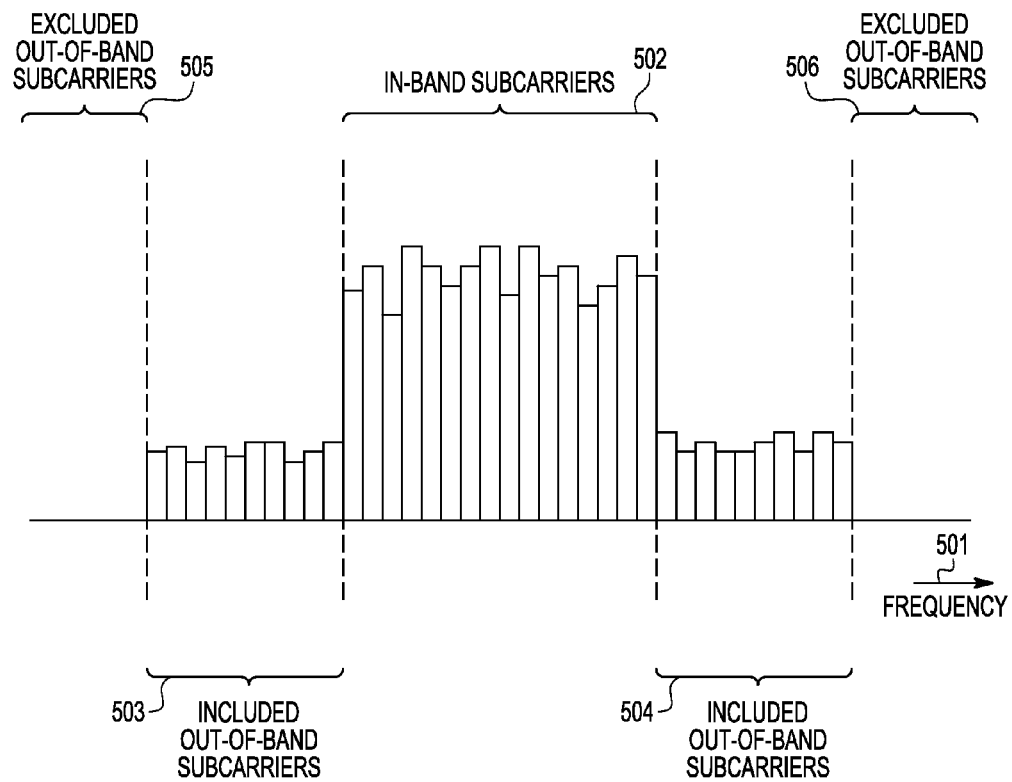
FIG. 5 is a frequency domain diagram illustrating subcarriers comprising in-band subcarriers and included out-of-band subcarriers but not comprising excluded out-of-band subcarriers in accordance with at least one embodiment.

FIG. 5 is a frequency domain diagram illustrating subcarriers comprising in-band subcarriers 502 and included out-of-band subcarriers 503 and 504 but not comprising excluded out-of-band subcarriers 505 and 506 in accordance with at least one embodiment. The subcarriers are shown along frequency axis 501. The frequency domain diagram of FIG. 5 shows, for example, what a signal corresponding to a filtered clipped frequency domain representation at the output of frequency domain filter circuit 211 of FIG. 2 may look like. Such a signal does not comprise excluded out-of-band subcarriers 505 and 506, as they have been filtered out by frequency domain filter circuit 211. However, the signal does comprise included out-of-band subcarriers 503 and 504, which are, for example, adjacent in frequency to in-band subcarriers 502, while excluded out-of-band subcarriers 505 and 506 are distal in frequency to in-band subcarriers 502. As an example in the context of power line communications (PLC), for a G3 PLC implementation, the ratio of the number of included in-band subcarriers to the number of included out-of-band subcarriers may be, for example, 36:40, i.e., 90%. As another example in the context of PLC, for a particular PRIME PLC implementation, the ratio may be 97:120, i.e., approximately 80%. Examples of possible ranges of values for the ratio of the number of included in-band subcarriers to the number included are 70-100%, inclusive; 75-95%, inclusive; 80-90%, inclusive; 75-85%, inclusive; 85-95%, inclusive. Simulations may be performed to select a value that provides an acceptable result. If the result is not acceptable, the value may be changed to a value that improves the result.

Figure 6:
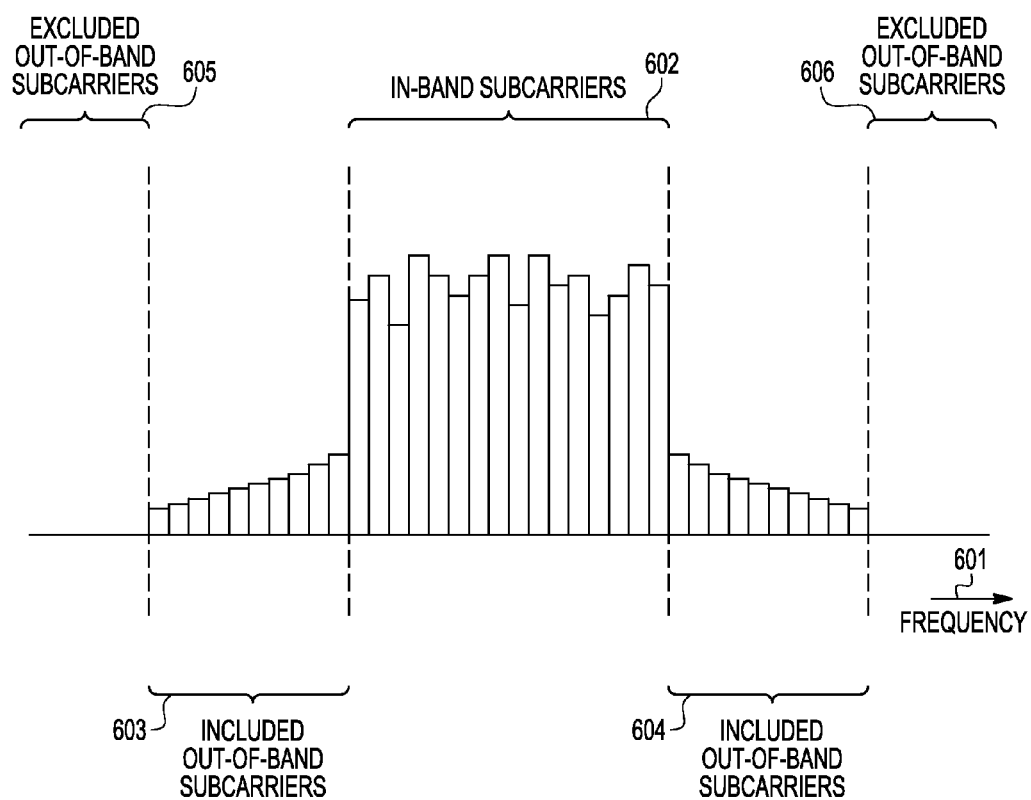
FIG. 6 is a frequency domain diagram illustrating subcarriers comprising in-band subcarriers and included out-of-band subcarriers, wherein a window has been applied to the included out-of-band to adjust their amplitudes in accordance with at least one embodiment.

FIG. 6 is a frequency domain diagram illustrating subcarriers comprising in-band subcarriers 602 and included out-of-band subcarriers 603 and 604, wherein a window has been applied to the included out-of-band to adjust their amplitudes in accordance with at least one embodiment. The subcarriers are shown along frequency axis 601. Excluded out-of-band subcarriers 605 and 606 are not shown, as the subcarriers of FIG. 6 do not comprise excluded out-of-band subcarriers 605 and 606. The frequency domain diagram of FIG. 6 shows, for example, what a signal corresponding to a filtered clipped frequency domain representation at the output of frequency domain filter circuit 211 of FIG. 2 may look like. Such a signal does not comprise excluded out-of-band subcarriers 605 and 606, as they have been filtered out by frequency domain filter circuit 211. However, the signal does comprise included out-of-band subcarriers 603 and 604, which are, for example, adjacent in frequency to in-band subcarriers 602, while excluded out-of-band subcarriers 605 and 606 are distal in frequency to in-band subcarriers 602. Frequency domain filter circuit 211 has filtered included out-of-band subcarriers 603 and 604 to adjust their amplitudes to control out-of-band energy. However, the amplitudes of included out-of-band subcarriers 603 and 604 have not been reduced to zero. Rather, finite non-zero amplitudes of included out-of-band subcarriers 603 and 604 are maintained, which helps avoid PAPR regrowth.

Figure 7:
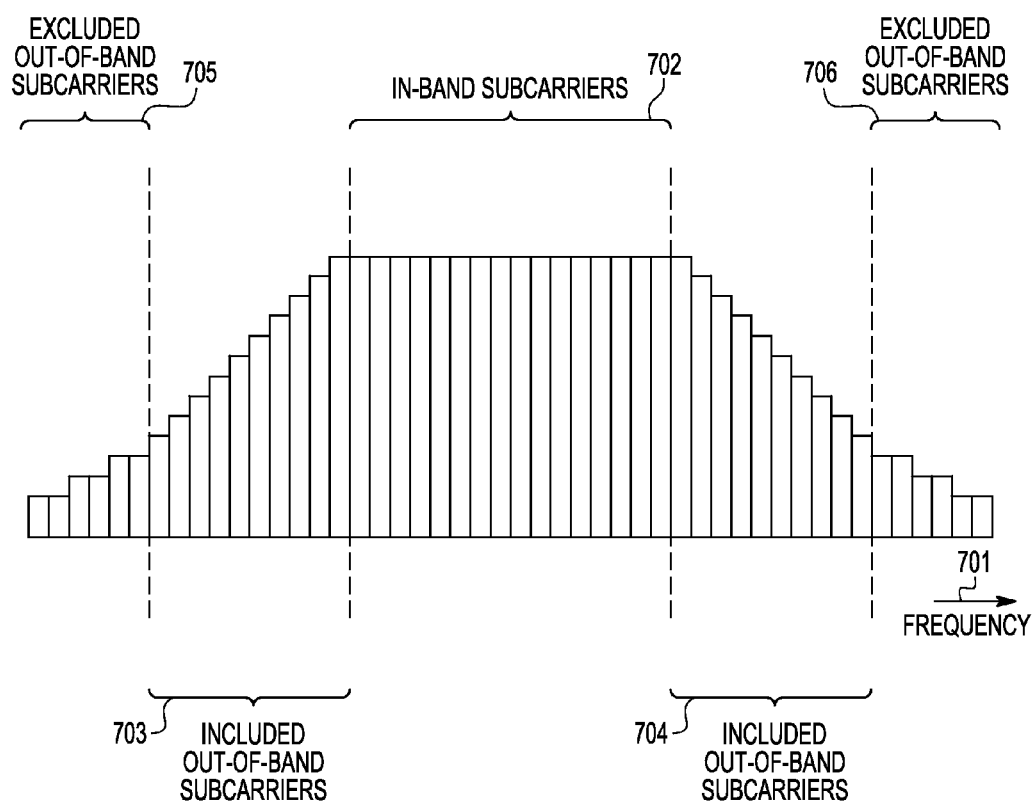
FIG. 7 is a frequency domain diagram illustrating subcarriers comprising in-band subcarriers, included out-of-band subcarriers, and excluded out-of-band subcarriers.

FIG. 7 is a frequency domain diagram illustrating subcarriers comprising in-band subcarriers 702, included out-of-band subcarriers 703 and 704, and excluded out-of-band subcarriers 705 and 706. The subcarriers are shown along frequency axis 701. The frequency domain diagram of FIG. 7 shows, for example, what a signal corresponding to a down-sampled clipped frequency domain representation at the input to frequency domain filter circuit 211 of FIG. 2 may look like. Such a signal may comprise excluded out-of-band subcarriers 705 and 706, as excluded out-of-band subcarriers 705 and 706 have not yet been filtered out by the frequency domain filter 211. As an example, simulations may be performed to select which out-of-band subcarriers will be included and which will be excluded. One or more results of the simulations, such as one or more of the resulting PAPR, the resulting BER, the resulting BLER, and the like may be evaluated and used as a basis for the selection of which out-of-band subcarriers are to be included and which are to be excluded.

In accordance with at least one embodiment, PAPR is reduced in a case where only a subset of the available subcarriers is used for signal transmission. Available subcarriers are all subcarriers allocated to a particular channel and available for use by transmissions on that particular channel. A subset of the available subcarriers is a plurality of the available subcarriers fewer than all of the available subcarriers for their corresponding channel. Accordingly, systems that use all available subcarriers allocated to a channel for communication over that channel are not using a subset of available subcarriers, and systems wherein the in-band subcarriers and the included out-of-band subcarriers are a subset of a plurality of available subcarriers do not use all available subcarriers, as some of the available subcarriers are left as excluded out-of-band subcarriers upon which no transmission occurs in accordance with at least one embodiment. Thus, the benefits of a multi-carrier digital communication system, such as OFDM or DMT, may be obtained, while performance may be improved by reducing PAPR in a manner that has minimal impact on error rates, such as BER and BLER.

In accordance with at least one embodiment, a method for processing a digitally modulated communication signal is provided. The method comprises upsampling a first frequency domain representation of the digitally modulated communication signal by an upsampling factor to generate a second frequency domain representation, transforming the second frequency domain representation into a first time domain representation, limiting the magnitude of samples of the first time domain representation to a magnitude limit, transforming the first time domain representation with the magnitude limit into a third frequency domain representation, downsampling the third frequency domain representation by a downsampling factor to produce a fourth frequency domain representation, and filtering the fourth frequency domain representation to produce a fifth frequency domain representation, wherein the fifth frequency domain representation is filtered to include in-band subcarriers and included out-of-band subcarriers but to exclude excluded out-of-band subcarriers. In accordance with at least one embodiment, the upsampling factor is greater than the downsampling factor. In accordance with at least one embodiment, the upsampling factor is in a range from twice to eight times, inclusive, the downsampling factor. In accordance with at least one embodiment, the in-band subcarriers and the included out-of-band subcarriers are a subset of a plurality of available subcarriers. In accordance with at least one embodiment, the excluded out-of-band subcarriers include all out-of-band subcarriers having frequencies lower than a low frequency limit of the included out-of-band subcarriers. In accordance with at least one embodiment, the excluded out-of-band subcarriers include all out-of-band subcarriers having frequencies higher than a high frequency limit of the included out-of-band subcarriers. In accordance with at least one embodiment, the fifth frequency domain representation conforms to a specified spectral emission mask, wherein the specified spectral emission mask describes limits in frequency and signal strength which the digitally modulated communication signal is permitted to occupy in an electromagnetic spectrum.

In accordance with at least one embodiment, a transmitter for processing a digitally modulated communication signal is provided. The transmitter comprises processing circuits and a digital-to-analog converter (DAC) coupled to the processor, the processing circuits configured to upsample a first frequency domain representation of the digitally modulated communication signal by an upsampling factor to produce a second frequency domain representation, to transform the second frequency domain representation into a first time domain representation, to limit the magnitude of samples of the first time domain representation to a magnitude limit to produce a second time domain representation, to transform the second time domain representation into a third frequency domain representation, to downsample the third frequency domain representation by a downsampling factor to produce a fourth frequency domain representation, to filter the fourth frequency domain representation to produce a fifth frequency domain representation, wherein the fifth frequency domain representation is filtered to include in-band subcarriers and included out-of-band subcarriers but to exclude excluded out-of-band subcarriers, to transform the fifth frequency domain representation into a third time domain representation; and to provide the third time domain representation to the DAC to produce an analog signal for transmission. In accordance with at least one embodiment, the upsampling factor is greater than the downsampling factor. In accordance with at least one embodiment, the upsampling factor is in a range from twice to eight times, inclusive, the downsampling factor. In accordance with at least one embodiment, the selected subcarriers are a subset of a plurality of available subcarriers. In accordance with at least one embodiment, the excluded out-of-band subcarriers include all out-of-band subcarriers having frequencies lower than a low frequency limit of the included out-of-band subcarriers. In accordance with at least one embodiment, the excluded out-of-band subcarriers include all out-of-band subcarriers having frequencies higher than a high frequency limit of the included out-of-band subcarriers. In accordance with at least one embodiment, the fifth frequency domain representation conforms to a specified spectral emission mask, wherein the specified spectral emission mask describes limits in frequency and signal strength which the digitally modulated communication signal is permitted to occupy in an electromagnetic spectrum.

In accordance with at least one embodiment, a method for processing a digitally modulated communication signal is provided. In accordance with at least one embodiment, the method comprises selecting an upsampling factor for upsampling, selecting a downsampling factor for downsampling, selecting selected subcarriers for frequency domain filtering, upsampling a first frequency domain representation of the digitally modulated communication signal by the upsampling factor to produce a second frequency domain representation, transforming the second frequency domain representation into a first time domain representation, limiting the magnitude of samples of the first time domain representation to a magnitude limit to produce a second time domain representation, transforming the second time domain representation into a third frequency domain representation, downsampling the third frequency domain representation by the downsampling factor to produce a fourth frequency domain representation, filtering the fourth frequency domain representation to produce a fifth frequency domain representation, wherein the fifth frequency domain representation is filtered, based on the selecting the selected subcarriers, to include in-band subcarriers and included out-of-band subcarriers in the fifth frequency domain representation but to exclude excluded out-of-band subcarriers from the fifth frequency domain representation, transforming the fifth frequency domain representation into a third time domain representation, determining an error rate resulting from selecting of the upsampling factor, the downsampling factor, and the selected subcarriers, determining if the error rate is acceptable, and, if the error rate is unacceptable, selecting at least one new value for at least one parameter selected from a group consisting of the upsampling factor, the downsampling factor, and the selected subcarriers. In accordance with at least one embodiment, the method further comprises comparing the error rate to an error rate value, wherein the error rate value is a bit error rate (BER). In accordance with at least one embodiment, the method further comprises comparing the error rate to an error rate value, wherein the error rate value is a block error rate (BLER). In accordance with at least one embodiment, the fifth frequency domain representation conforms to a specified spectral emission mask, wherein the specified spectral emission mask describes limits in frequency and signal strength which the digitally modulated communication signal is permitted to occupy in an electromagnetic spectrum. In accordance with at least one embodiment, the upsampling factor is greater than the downsampling factor. In accordance with at least one embodiment, the upsampling factor is in a range from twice to eight times, inclusive, the downsampling factor.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method for processing a digitally modulated communication signal comprising:
upsampling a first frequency domain representation of the digitally modulated communication signal by an upsampling factor to generate a second frequency domain representation;
transforming the second frequency domain representation into a first time domain representation;
limiting the magnitude of samples of the first time domain representation to a magnitude limit;
transforming the first time domain representation with the magnitude limit into a third frequency domain representation;
downsampling the third frequency domain representation by a downsampling factor to produce a fourth frequency domain representation; and
filtering the fourth frequency domain representation in a frequency domain filter circuit to produce a fifth frequency domain representation, wherein the fifth frequency domain representation is filtered to include in-band subcarriers and included out-of-band subcarriers but to exclude excluded out-of-band subcarriers.

2. The method of claim 1 wherein the upsampling factor is greater than the downsampling factor.

3. The method of claim 1 wherein the upsampling factor is in a range from twice to eight times, inclusive, the downsampling factor.

4. The method of claim 1 wherein the in-band subcarriers and the included out-of-band subcarriers are a subset of a plurality of available subcarriers.

5. The method of claim 1 wherein the excluded out-of-band subcarriers include all out-of-band subcarriers having frequencies lower than a low frequency limit of the included out-of-band subcarriers.

6. The method of claim 1 wherein the excluded out-of-band subcarriers include all out-of-band subcarriers having frequencies higher than a high frequency limit of the included out-of-band subcarriers.

7. The method of claim 1 wherein the fifth frequency domain representation conforms to a specified spectral emission mask, wherein the specified spectral emission mask describes limits in frequency and signal strength which the digitally modulated communication signal is permitted to occupy in an electromagnetic spectrum.

8. A transmitter for processing a digitally modulated communication signal comprising:
processing circuits; and
a digital-to-analog converter (DAC) coupled to the processor, the processing circuits configured to upsample a first frequency domain representation of the digitally modulated communication signal by an upsampling factor to produce a second frequency domain representation, to transform the second frequency domain representation into a first time domain representation, to limit the magnitude of samples of the first time domain representation to a magnitude limit to produce a second time domain representation, to transform the second time domain representation into a third frequency domain representation, to downsample the third frequency domain representation by a downsampling factor to produce a fourth frequency domain representation, to filter the fourth frequency domain representation to produce a fifth frequency domain representation, wherein the fifth frequency domain representation is filtered to include in-band subcarriers and included out-of-band subcarriers but to exclude excluded out-of-band subcarriers, to transform the fifth frequency domain representation into a third time domain representation; and to provide the third time domain representation to the DAC to produce an analog signal for transmission.

9. The transmitter of claim 8 wherein the upsampling factor is greater than the downsampling factor.

10. The transmitter of claim 8 wherein the upsampling factor is in a range from twice to eight times, inclusive, the downsampling factor.

11. The transmitter of claim 8 wherein the selected subcarriers are a subset of a plurality of available subcarriers.

12. The transmitter of claim 8 wherein the excluded out-of-band subcarriers include all out-of-band subcarriers having frequencies lower than a low frequency limit of the included out-of-band subcarriers.

13. The transmitter of claim 8 wherein the excluded out-of-band subcarriers include all out-of-band subcarriers having frequencies higher than a high frequency limit of the included out-of-band subcarriers.

14. The transmitter of claim 8 wherein the fifth frequency domain representation conforms to a specified spectral emission mask, wherein the specified spectral emission mask describes limits in frequency and signal strength which the digitally modulated communication signal is permitted to occupy in an electromagnetic spectrum.

15. A method for processing a digitally modulated communication signal comprising:
selecting an upsampling factor for upsampling;
selecting a downsampling factor for downsampling;
selecting selected subcarriers for frequency domain filtering;
upsampling a first frequency domain representation of the digitally modulated communication signal by the upsampling factor to produce a second frequency domain representation;
transforming the second frequency domain representation into a first time domain representation;
limiting the magnitude of samples of the first time domain representation to a magnitude limit to produce a second time domain representation;
transforming the second time domain representation into a third frequency domain representation;
downsampling the third frequency domain representation by the downsampling factor to produce a fourth frequency domain representation;
filtering the fourth frequency domain representation in a frequency domain filter circuit to produce a fifth frequency domain representation, wherein the fifth frequency domain representation is filtered, based on the selecting the selected subcarriers, to include in-band subcarriers and included out-of-band subcarriers in the fifth frequency domain representation but to exclude excluded out-of-band subcarriers from the fifth frequency domain representation;
transforming the fifth frequency domain representation into a third time domain representation;
determining an error rate resulting from selecting of the upsampling factor, the downsampling factor, and the selected subcarriers;
determining if the error rate is acceptable; and
if the error rate is unacceptable, selecting at least one new value for at least one parameter selected from a group consisting of the upsampling factor, the downsampling factor, and the selected subcarriers.

16. The method of claim 15 further comprising:
comparing the error rate to an error rate value, wherein the error rate value is a bit error rate (BER).

17. The method of claim 15 further comprising:
comparing the error rate to an error rate value, wherein the error rate value is a block error rate (BLER).

18. The method of claim 15 wherein the fifth frequency domain representation conforms to a specified spectral emission mask, wherein the specified spectral emission mask describes limits in frequency and signal strength which the digitally modulated communication signal is permitted to occupy in an electromagnetic spectrum.

19. The method of claim 15 wherein the upsampling factor is greater than the downsampling factor.

20. The method of claim 19 wherein the upsampling factor is in a range from twice to eight times, inclusive, the downsampling factor.

* * * * *